US007193404B2

(12) United States Patent
Weightman

(10) Patent No.: US 7,193,404 B2
(45) Date of Patent: Mar. 20, 2007

(54) LOAD CONTROL CIRCUIT AND METHOD FOR ACHIEVING REDUCED ACOUSTIC NOISE

(75) Inventor: Russell Weightman, Abington, PA (US)

(73) Assignee: Lutron Electronics Co., Ltd., Coopersburg, PA (US)

( * ) Notice: Subject to any disclaimer, the term of this patent is extended or adjusted under 35 U.S.C. 154(b) by 284 days.

(21) Appl. No.: 10/997,195

(22) Filed: Nov. 24, 2004

(65) Prior Publication Data

US 2006/0109702 A1 May 25, 2006

(51) Int. Cl.
*G05B 24/02* (2006.01)
*G05F 1/40* (2006.01)
*H02M 5/00* (2006.01)

(52) U.S. Cl. ....................................... 323/325; 315/194

(58) Field of Classification Search ................ 323/148, 323/149, 152–154, 217–219, 320, 324, 325, 323/365; 315/194, 199, 209 SC, 291
See application file for complete search history.

(56) References Cited

U.S. PATENT DOCUMENTS 3,588,598 A 6/1971 Isaacs
3,609,517 A 9/1971 Tucker
3,816,794 A * 6/1974 Snyder ........................ 315/194
4,334,171 A * 6/1982 Parman et al. .............. 315/199
4,612,480 A 9/1986 Kneisel et al.
4,680,536 A * 7/1987 Roszel et al. ............... 323/321
4,689,547 A 8/1987 Rowen et al.
4,745,351 A 5/1988 Rowen et al.
4,797,599 A 1/1989 Ference et al.
4,876,498 A 10/1989 Luchaco et al.
4,954,768 A 9/1990 Luchaco et al.
5,237,264 A 8/1993 Moseley et al.
5,619,081 A 4/1997 Gershen et al.
6,155,568 A * 12/2000 Franklin ..................... 273/292
6,310,439 B1 10/2001 Jacoby, Jr. et al.
7,015,656 B2 * 3/2006 Wang ......................... 315/291

* cited by examiner

*Primary Examiner*—Matthew V. Nguyen
(74) *Attorney, Agent, or Firm*—Ostrolenk, Faber, Gerb & Soffen, LLP

(57) ABSTRACT

A load control circuit having first and second terminals for connection in series with a controlled load comprises a bidirectional semiconductor switch for switching at least a portion of both positive and negative half cycles of an alternating current source waveform to the load. The bidirectional semiconductor switch has a control electrode. The load control circuit includes a phase angle setting circuit, including a timing circuit, which sets the phase angle during each half cycle of the AC source waveform when the bidirectional semiconductor switch conducts. The phase angle setting circuit includes a voltage threshold trigger device connected in series with the control electrode of the switch. The phase angle setting circuit further comprises a rectifier bridge connected in series between an output of the timing circuit and the control electrode of the semiconductor switch, wherein the rectifier bridge has a first pair of terminals and a second pair of terminals, the first pair of terminals connected in series between an output of the timing circuit and the control electrode of the semiconductor switch, and the second pair of terminals connected to the voltage threshold trigger device. The load control circuit further includes an impedance in series electrical connection with the semiconductor switch control electrode. Acoustic noise generated in the load connected in series with the load control circuit is reduced, particularly when the load is a toroidal transformer driving a magnetic low voltage lamp and the load control circuit is a two-wire dimmer.

52 Claims, 11 Drawing Sheets

LOAD CONTROL CIRCUIT AND METHOD FOR ACHIEVING REDUCED ACOUSTIC NOISE

BACKGROUND OF THE INVENTION

The present invention relates to load control circuits, for example, lamp dimming circuits, and in particular, to an improved load control circuit for reducing acoustic noise, particularly in connection with dimming control of transformer-supplied lighting loads. The invention can also be used to control the speed of electrical motors for applications such as fans, motorized window treatments, and electrical tools, such as drills, grinders, and sanders.

Low-voltage lighting, for example, halogen lighting, has come into increased use in recent years. These lamps operate on low voltages, for example 12 volts or 24 volts, and accordingly, a transformer is employed to reduce the normal line voltage to the low voltage necessary to operate the lamps.

There has been an increase in complaints about acoustic noise by customers operating such lamps. The acoustic noise is believed to result from a number of factors including: the use of low-profile transformers in the same space as the lights, the increase in the use of toroidal transformers (versus "coil and core" transformers, such as transformers having EI cores, which have laminated cores made from E-shaped and I-shaped pieces), and the increase in use of open wire or rail low-voltage lighting in residential applications. Primarily, the increase appears to be due to the use of large VA (volt-ampere) toroidal transformers (typically, in the range of 150–600 VA).

Acoustic noise has always been an issue with magnetic low-voltage (MLV) loads. A lamp debuzzing coil or choke placed in series with the transformer primary winding reduces or eliminates the noise by increasing the rise time of the current. However, this solution has proved inadequate in view of the above factors now often present in the implementation of low-voltage lighting. It appears that one of the reasons for the acoustic noise is that the transformer saturates more easily due to direct current (DC) components in the input waveform. This is particularly a problem when the transformer has little or no air gap, such as is true of toroidal transformers.

There is accordingly a need for an improved load control circuit, and in particular, a dimmer circuit for low-voltage lighting and in applications where there are MLV loads, in order to reduce the generation of acoustic noise.

FIG. 1 shows a typical prior art two-wire phase-cut (sometimes referred to as "phase-control") dimming circuit 100. Dimming circuit 100 is known as a two-wire dimmer because the only connections necessary are the HOT terminal 102, which is connected to a first terminal of a source of line frequency alternating current (AC) voltage 104, and the DIMMED HOT terminal 106, which is connected to a first terminal of a load 108. A second terminal of the load 108 is connected to a second terminal of the AC voltage source 104 to complete the electrical path. The dimmed hot output voltage comprises a phase-cut AC voltage waveform, as well known to those of skill in the art, wherein current is only provided to the lamp load after a certain phase angle of each half cycle of the AC waveform.

In order to accomplish this, a triac 110 is employed to control the amount of voltage delivered to the load 108. A timing circuit 120 comprises a double-phase-shift resistor-capacitor (RC) circuit having a resistor R122, a potentiometer R124, and capacitors C126, C128. The timing circuit 120 sets a threshold voltage, which is the voltage across capacitor C128, for turning on the triac 110 after a selected phase angle in each half cycle. The charging time of the capacitor C128 is varied in response to a change in the resistance of potentiometer R124 to change the selected phase angle at which the triac conducts. A diac 130 is in series with the control input, or gate, of the triac 110 and is employed as a triggering device. The diac 130 has a breakover voltage (for example 30V), and will pass current to the triac gate only when the threshold voltage exceeds the breakover voltage of the diac plus the gate voltage of the triac. The prior art circuit also employs an input noise/EMI filter stage comprising an inductor L142, a resistor R144, and a capacitor C146.

Another prior art circuit 200 is shown in FIG. 2A. This circuit employs a voltage compensation circuit 250, including a diac 252 and a resistor R254, to adjust the voltage to the potentiometer R224 to compensate for line voltage amplitude variations. As is well known, diacs have a negative impedance transfer function so that, as the current through the diac decreases, the voltage across the diac increases. As the voltage across the dimmer decreases, the current through the diac 252 also decreases. As a result, the voltage across the diac 252 increases, causing the current flowing through R224 to C228 to increase, thereby causing capacitor C228 to charge to the threshold voltage sooner. This results in increased conduction time for triac 210 to compensate for the decreased voltage across the dimmer, thereby maintaining the set light level.

In addition, the prior art circuit shown in FIG. 2A includes a DC voltage correction circuit 260, including a capacitor C264 and a resistor R262, to maintain a net average output voltage of zero volts DC. The operation of the DC voltage correction circuit is described in U.S. Pat. No. 4,876,498, the entirety of which is incorporated by reference herein, and hence, will not be further described here.

The prior art devices of FIGS. 1 and 2A have been known to cause excessive acoustic noise to be generated in a load, such as an MLV lamp load, comprising a transformer-supplied low-voltage lamp, when such a load is coupled to the output of the dimmer.

FIG. 2B shows the waveform of the voltage across a 600 VA toroidal transformer provided by the prior art circuit of FIG. 2A. The waveform shows asymmetry in the two half cycles. Asymmetry, as used herein, means that the conduction time of the triac in the positive half cycle, $t_{2(POS)}$, is not equal to the conduction time of the triac in the negative half cycle, $t_{2(NEG)}$. As a result, the area under the curve of the voltage across the load (measured in volt-seconds) during the positive half cycle is not equal to the area under the curve of the voltage across the load (measured in volt-seconds) during the negative half cycle. This asymmetry results in the output voltage having a net DC component. It is believed that this asymmetry causes the transformer to saturate, thereby increasing acoustic noise. The voltage overshoot shown in FIG. 2B, in the portion labeled A, indicates that the transformer is saturating as a result of the asymmetry in the output voltage waveform. In this case, a lamp debuzzing coil or choke will be unable to eliminate acoustic noise from the transformer, resulting from asymmetry in the output voltage, because the coil or choke does not eliminate the net DC component.

FIG. 3A shows the schematic of another prior art circuit comprising a three-wire dimmer 300 having a terminal connection NEUTRAL for direct connection to the neutral line of an AC voltage source. This circuit has a similar structure to the prior art circuit of FIG. 2A, and includes a triac 310, a timing circuit 320, a trigger circuit 330, a voltage compensation circuit 350, and a DC correction circuit 360. Timing circuit 320 includes a potentiometer R324, for setting the desired conduction time for the triac 310 and hence, the desired output voltage for the dimmer 300, and a capacitor C328 that charges to a threshold voltage. Trigger circuit 330 includes a current amplifier consisting of diodes D331, D332, and transistors Q333, Q334, a full-wave bridge rectifier consisting of bridge BR335, resistors R336, R337, a threshold device consisting of silicon bilateral switch 338, an optocoupler 339, and resistors R340, R341. The optocoupler 339 provides electrical isolation between NEUTRAL and the triac 310. The bridge BR335 allows current to flow through the photodiode 339A of the optocoupler 339 in the same direction during both half cycles of the AC line voltage. The silicon bilateral switch 338 allows current to flow through the photodiode 339A only when the voltage across capacitor C328 reaches a threshold value.

It has been discovered that the circuit of FIG. 3A causes less acoustic noise than the circuits of FIGS. 1 and 2A. FIG. 3B shows the output waveform of the circuit of FIG. 3A, showing how it is more symmetrical, with a smaller DC component. The three-wire dimmer of FIG. 3A has a more symmetrical output waveform because the presence of the neutral connection allows the timing circuit 320 to be decoupled from the load. The timing circuit 320 of the three-wire dimmer charges from the HOT terminal through the timing circuit 320 to the NEUTRAL terminal. In contrast, the timing circuit 220 of the two-wire dimmer of FIG. 2A charges from the HOT terminal through the timing circuit 220 to the DIMMED HOT terminal, then through the load to the neutral connection of the AC voltage source.

It has been realized that if the conduction times of the bidirectional switch of a two-wire load control circuit are the same in the positive and negative half cycles, then the output voltage waveform exhibits greater symmetry, and hence, a reduced DC component. It is believed that asymmetries in the voltage and current characteristics of both the diac and the triac in their respective modes of operation contribute to the asymmetry and DC component of the output waveform. In particular, three sources of asymmetry have been identified: (1) the breakover voltage of the diac in a first direction is not equal to the breakover voltage of the diac in a second (opposite) direction; (2) the voltage-current characteristic of the diac when conducting in the first direction is not equal to the voltage-current characteristic of the diac when conducting in the second direction; and (3) the current into the gate of the triac at turn-on in a first direction is not equal to the current out of the gate of the triac at turn-on in a second (opposite) direction.

Referring to FIG. 3C, there may be seen the voltage-current (V-I) characteristic for a diac. It has been discovered that the V-I characteristics for diacs operating in the first quadrant are seldom (if ever) symmetric with the V-I characteristics for the same diacs operating in the third quadrant. For example, $V_{BO+}$, which is the breakover voltage of the diac in the first (or forward) direction of conduction, may not be equal in magnitude to $V_{BO-}$, which is the breakover voltage of the diac in the second (or reverse) direction of conduction. Unequal magnitudes of breakover voltage particularly affect the charging time of the capacitor C228 shown in the two-wire dimmer of FIG. 2A.

The shapes of the V-I characteristics in the first (I) and third (III) quadrants of operation, and in particular, the magnitudes of the breakback voltages, $V_{BB+}$ and $V_{BB-}$, affect the level to which the capacitor C228 ultimately discharges. If these V-I characteristics are not perfectly symmetrical, then the capacitor C228 may not discharge to the same point at the end of each half cycle of the line cycle. This can result in the initial conditions of capacitor C228 not being the same at the beginning of each half cycle. Accordingly, capacitor C228 will not consistently charge to the desired threshold voltage in the same amount of time from half cycle to half cycle.

Referring to FIG. 3D, there may be seen therein the waveform, $-V_{C228}$, for the voltage across the capacitor C228, and a waveform, $I_{GATE}$, of the gate current of the triac of the two-wire dimmer of FIG. 2A. In FIG. 3D, the vertical voltage scale is 20 V/div, the vertical current scale is 0.5 A/div, and the horizontal time scale is 2 ms/div. In the Figure, the polarity of the capacitor voltage $V_{C228}$ has been reversed for ease of viewing. It will be appreciated that, at the moment the triac begins conducting, a spike of current, $S_I$ (of about 0.65 A), flows in to the triac gate lead when the triac begins conducting in the first (or positive) direction (corresponding to conduction in quadrant I), and a spike of current, $S_{III}$ (of about 1.1 A), flows out of the triac gate lead when the triac begins conducting in the second (or negative) direction (corresponding to conduction in quadrant III). Thus, it may be seen that the current flowing out of the triac gate during the negative half cycle is nearly twice as large as the current flowing into the triac gate during the positive half cycle. Inequality in the magnitudes of the current spikes in the two directions results in the capacitor C228 discharging to different levels at the ends of each half cycle, which in turn results in the initial conditions of C228 being different at the beginning of the following half cycle. Differences in the initial conditions of capacitor C228 cause the conduction time of the triac to be different from one half cycle to the next half cycle.

Accordingly, there is a need for a two-wire load control circuit that supplies a symmetric voltage waveform, with substantially no DC component, to an MLV load, such as a transformer-supplied lamp load. In particular, there is a need for-a two-wire dimmer having a diac and a triac in which asymmetries in the diac and the triac have been substantially reduced or eliminated.

SUMMARY OF THE INVENTION

It is an object of the present invention to provide an improved load control circuit, for example, a dimmer circuit, that reduces acoustic noise, particularly when used with MLV lamp loads.

Another object of the invention is to provide a load control circuit that provides a voltage output waveform that has substantially no DC component.

The objects of the invention are achieved by a load control circuit comprising a bidirectional semiconductor switch for switching at least a portion of both positive and negative half cycles of an alternating current source waveform to a load, the bidirectional semiconductor switch having a control electrode, further comprising a phase angle setting circuit including a timing circuit which sets the phase angle during each half cycle of the AC source waveform when the bidirectional semiconductor switch conducts; the phase angle setting circuit including a voltage threshold trigger device connected in series with the control electrode of the switch, further comprising a rectifier bridge connected in series between an output of the timing circuit and the control electrode of the semiconductor switch, and wherein the rectifier bridge has a first pair of terminals and a second pair of terminals, the first pair of terminals connected in series between the output of the timing circuit and the control electrode of the semiconductor switch, and the second pair of terminals connected to the voltage threshold trigger device, whereby acoustic noise generated in the load connected in series with the load control circuit is reduced.

The objects of the invention are also achieved by a method for reducing acoustic noise generated in an electrical load driven by a phase-cut load control circuit from an AC source waveform, the method comprising setting a phase angle during each half cycle of the AC source waveform when a bidirectional semiconductor switch conducts, providing a voltage threshold trigger device connected in series with a control electrode of the switch, whereby control electrode current is provided to the switch when a threshold voltage is exceeded, further comprising providing the control electrode current to the switch such that the control electrode current flows in only one direction through the voltage threshold trigger device, thereby to reduce asymmetry in the control electrode current and contribute to reduced acoustic noise in the load.

The objects of the invention are also achieved by a load control circuit having first and second terminals for connection in series with a controlled load, the load control circuit comprising a bidirectional semiconductor switch for switching at least a portion of both positive and negative half cycles of an alternating current source waveform to a load, the bidirectional semiconductor switch having a control electrode, further comprising a phase angle setting circuit including a timing circuit which sets the phase angle during each half cycle of the AC source waveform when the bidirectional semiconductor switch conducts, the phase angle setting circuit including a voltage threshold trigger device connected in series with the control electrode of the switch, further comprising a first circuit connected between the timing circuit and the control electrode of the semiconductor switch for insuring that current flowing through the voltage threshold trigger device flows in only one direction, and wherein the first circuit has a first pair of terminals and a second pair of terminals, the first pair of terminals connected in series between an output of the timing circuit and the control electrode of the semiconductor switch, and the second pair of terminals connected to the voltage threshold trigger device, whereby acoustic noise generated in the load connected in series with the load control circuit is reduced.

The objects of the invention are further achieved by a two-wire dimmer for delivering power from an alternating current, line voltage source to a load, comprising: a bidirectional semiconductor switch, adapted to be coupled between said source and said load; said semiconductor switch having a control input and operable to provide an output voltage to said load; a timing circuit adapted to be coupled between said source and said load and having an output; said timing circuit operable to generate a signal representative of a desired conduction time of said bidirectional semiconductor switch; a trigger device having a first terminal in series electrical connection with said output of said timing circuit and a second terminal in series electrical connection with said control input of said bidirectional semiconductor switch; said trigger device having a first voltage-current characteristic when current is flowing from said first terminal to said second terminal, and a second voltage-current characteristic when current is flowing from said second terminal to said first terminal; wherein said first voltage-current characteristic is substantially identical to said second voltage-current characteristic; and an impedance in series electrical connection between said output of said timing circuit and said control input of said semiconductor switch such that said impedance ensures that the magnitude of the current that flows into said control input is substantially equal to the magnitude of the current that flows out of said control input.

Other objects, features and advantages of the present invention will become apparent from the following detailed description of the invention which refers to the accompanying drawings.

BRIEF DESCRIPTION OF THE DRAWINGS

The invention will be described in greater detail in the following detailed description in which.

Other objects, features and advantages of the invention will be apparent from the detailed description that follows.

DETAILED DESCRIPTION OF THE INVENTION

Figure 4A:
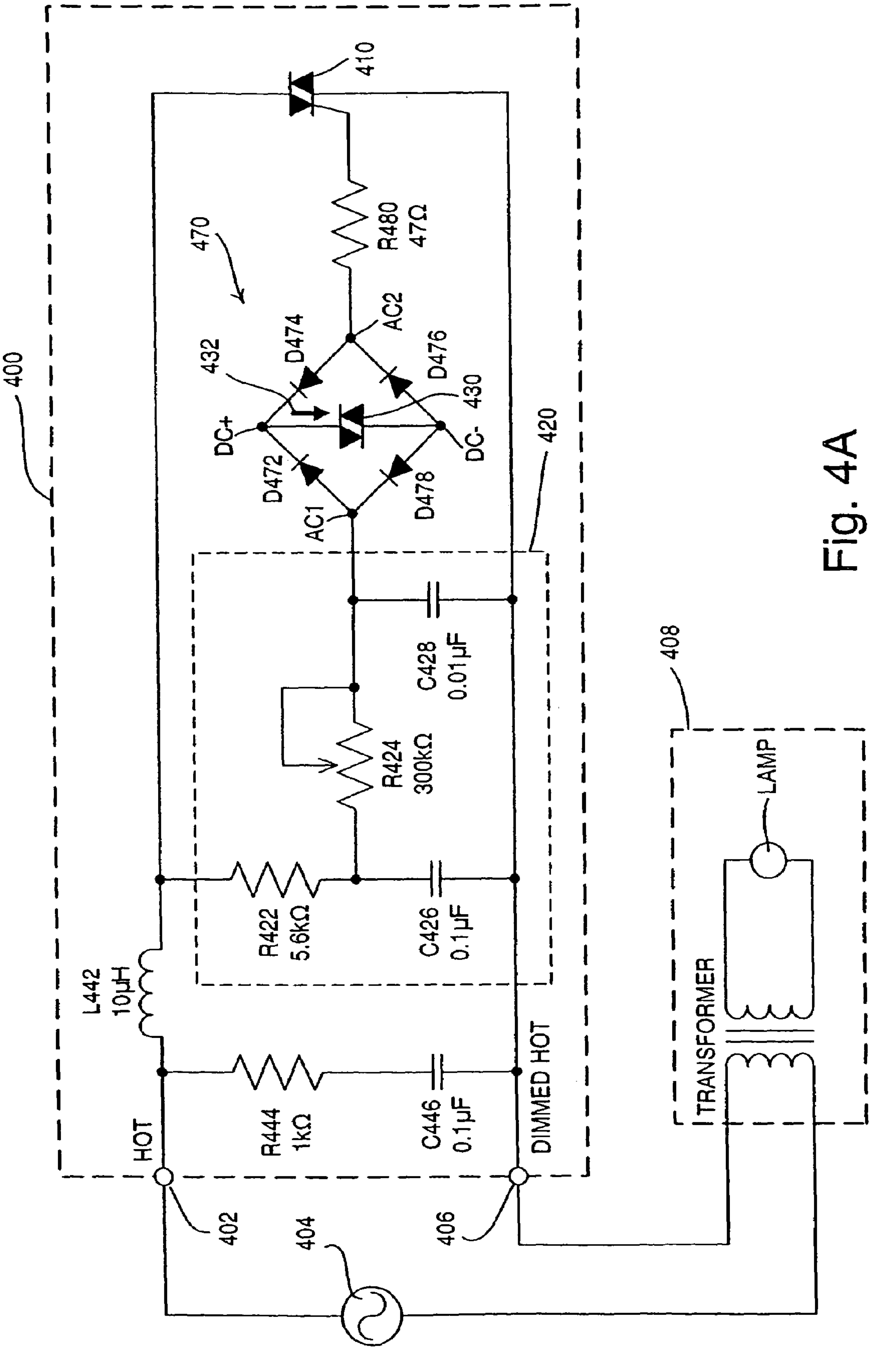
FIG. 4A shows the improved load control circuit according to the present invention.

With reference now to the drawings, FIG. 4A shows an improved load control circuit, and, in particular, a dimmer circuit 400, according to the present invention, for reducing acoustic noise. The hot side of the AC supply 404 is generally connected to a HOT terminal 402, and one side of the primary winding of the transformer driving the lamp load is typically connected to a DIMMED HOT terminal 406. The dimmer circuit includes a noise/EMI filter circuit comprising an inductor L442, a resistor R444, and a capacitor C446. Resistor R422, potentiometer R424, and capacitors C426, C428 form a double-phase-shift RC timing circuit 420 in which the time constant is variably set by the potentiometer R424 thereby changing the time over which capacitor C428 charges. The rate of charge of capacitor C428 will in turn change the phase angle of the AC waveform at which the bidirectional semiconductor switch (triac 410) conducts once the threshold of the trigger device (diac 430) is exceeded.

According to the present invention, in order to reduce acoustic noise, diac 430 is coupled into a rectifier bridge 470 comprising diodes D472, D474, D476 and D478. A first pair of terminals AC1, AC2, of the rectifier bridge are connected in series with the output of the timing circuit (unction of R424 and C428) and the gate of the triac 410, and preferably in series with a further resistor R480 whose function will be explained later herein. The diac 430 is connected across the second or DC output pair of terminals DC+, DC−, of the rectifier bridge.

The purpose of the rectifier bridge 470 is to ensure that current through the diac 430 always flows in the same direction. This eliminates any asymmetry between the conduction in the forward and reverse directions through the diac 430 since the current flow through the diac for both the positive and negative half cycles is always in the same direction. Using the convention of positive current flow, the current flow through the diac 430 is for both half cycles in the direction shown by arrow 432. During the positive half cycle, current flows through diode D472, the diac 430 in the direction of arrow 432 and then through diode D476. For the negative half cycle, current flows through diode D474, diac 430, in the direction of the arrow 432, and then through the diode D478. Accordingly, any asymmetry caused by current flowing in opposite directions in the diac is eliminated.

Thus, the diac 430 and the rectifier bridge 470 form a trigger device having a first terminal AC1 in series electrical connection with the output of the timing circuit 420, and a second terminal AC2 in series electrical connection with the control input of the bidirectional semiconductor switch 410. Further, the trigger device has a first voltage-current characteristic when current is flowing from the first terminal AC1 to the second terminal AC2, and a second voltage-current characteristic when current is flowing from the second terminal AC2 to the first terminal AC1. Because the rectifier bridge 470 constrains the current to flow through the diac 430 in the same direction during both positive and negative line half cycles, the first voltage-current characteristic is substantially identical to the second voltage-current characteristic.

Figure 1:
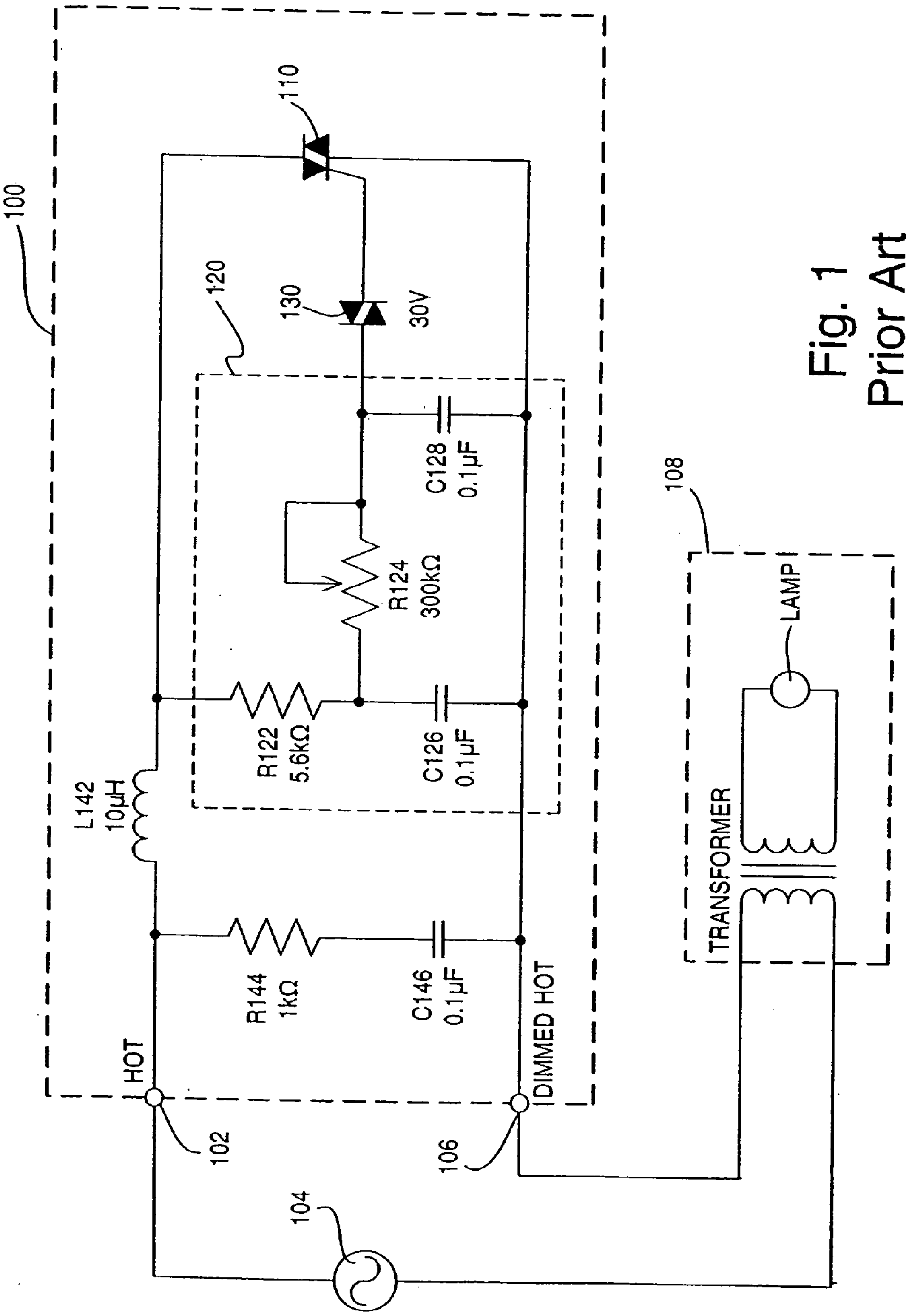
Fig. 1 Prior Art
FIG. 1 shows a prior art two-wire dimmer circuit.
Figure 2A:
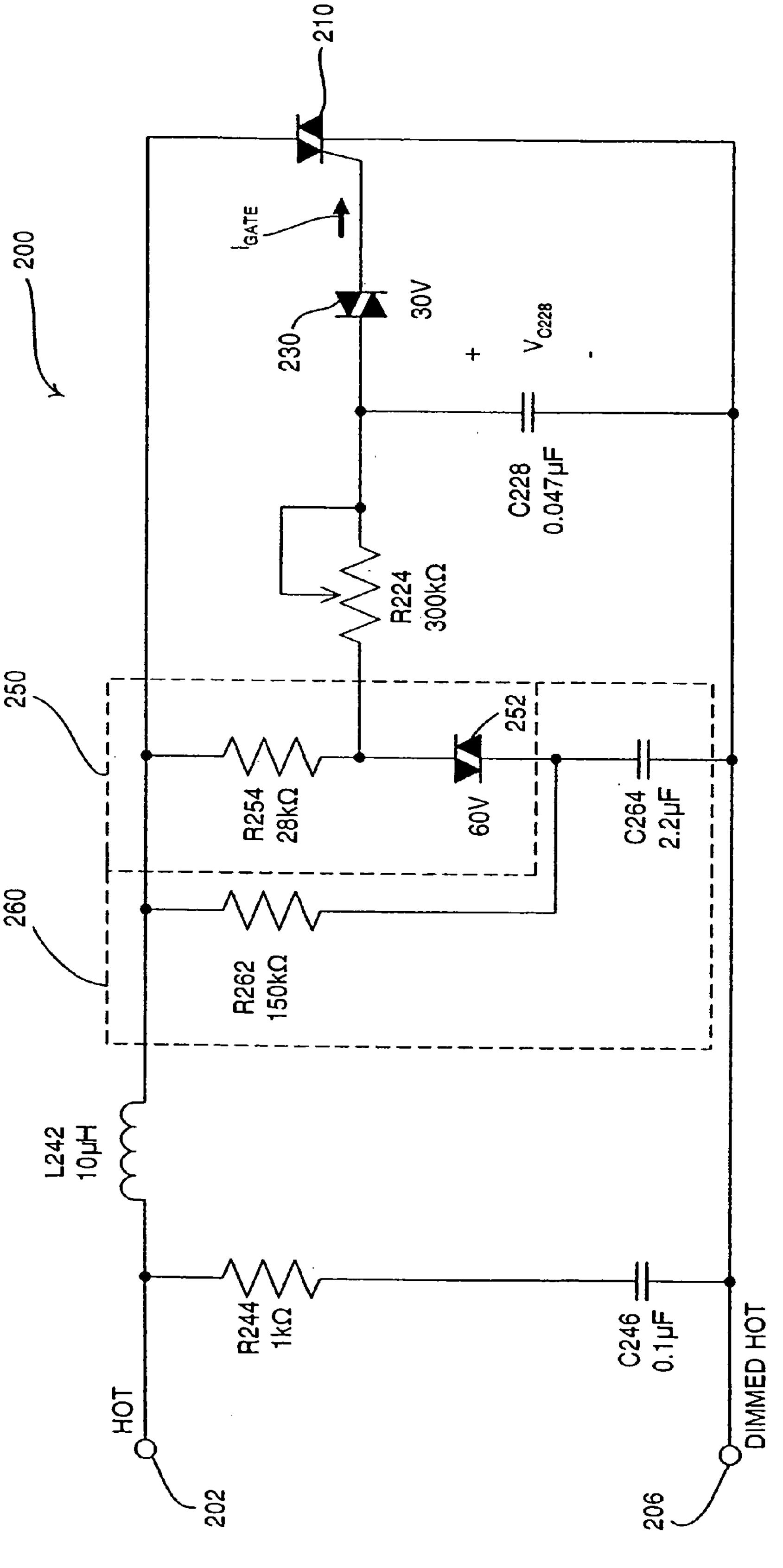
Fig. 2A Prior Art
FIG. 2A shows another prior art two-wire dimmer circuit.
Figure 6:
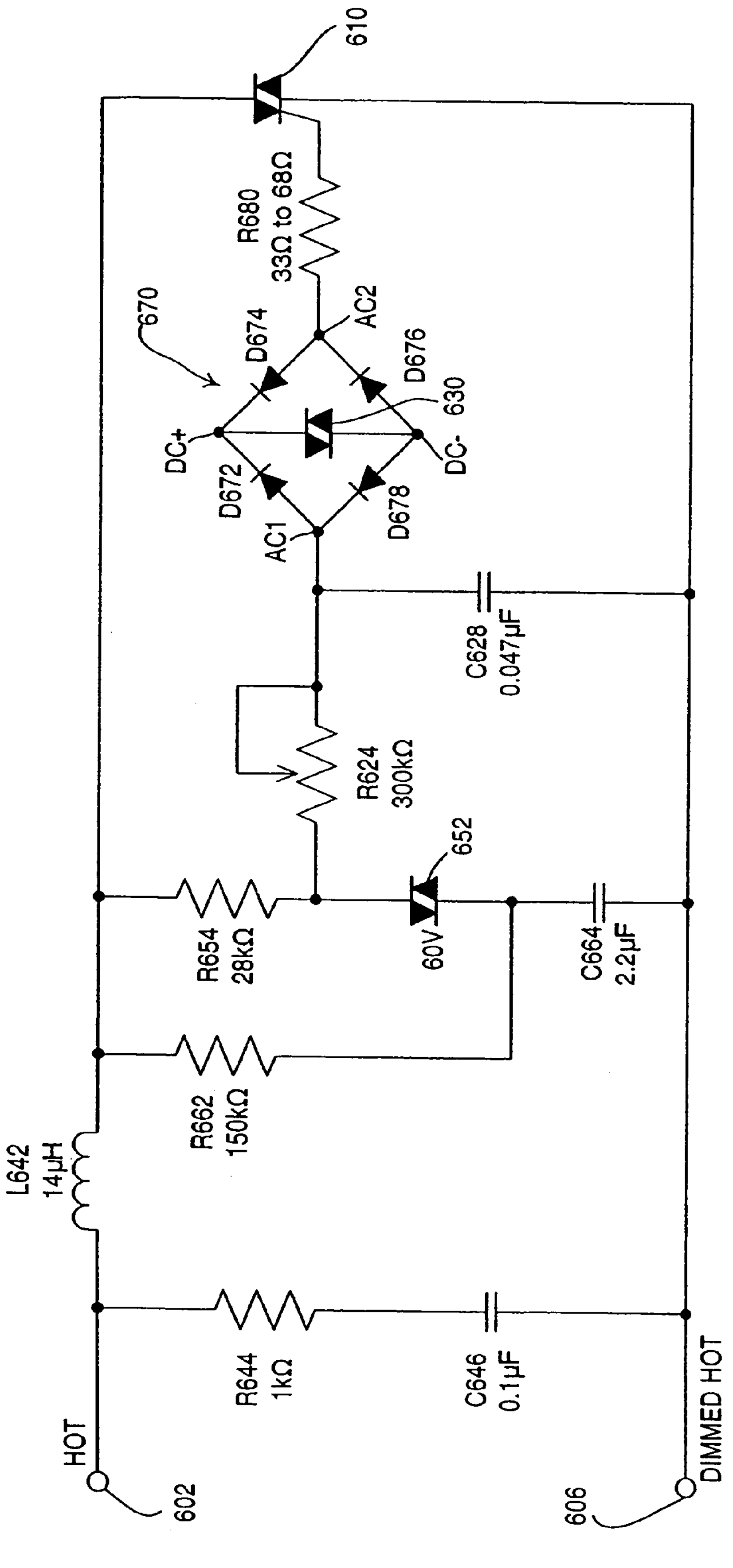
FIG. 6 shows the circuit of the invention employing a voltage compensating diac.

In addition, the compensation diac 252 of FIG. 2A has been eliminated from the circuit of FIG. 4A, thereby eliminating another potential source of asymmetry. However, the bridge rectifier 470 shown in FIG. 4A can also be used in the circuit of FIG. 2A to reduce asymmetry. This is shown in FIG. 6, which shows a circuit like that of FIG. 4A, but employing a voltage compensation diac 652. The load control circuit of FIG. 6 may be further modified by enclosing the compensation diac 652 within a rectifier bridge in a manner similar to that for the bridge 670 enclosing the diac 630.

Resistor R480 functions as a gate current limiting impedance. This gate resistor limits the gate current so that the initial condition of the firing capacitor C428 is substantially the same in successive positive and negative half cycles. Gate resistor R480 balances the gate current in both half cycles to equalize the discharge of the timing circuit capacitor C428 so that the initial conditions at the beginning of each successive half cycle are substantially the same. Preferred values for the resistor R480 range from about 33 ohms to about 68 ohms. Most preferably, the value of resistor R480 is about 47 ohms.

Although the gate current limiting impedance R480 has been shown located between the trigger device (comprising diac 430 and rectifier bridge 470) and the control lead of the bidirectional semiconductor switch 410, the impedance R480 may be located anywhere in series electrical connection with the control lead of the bidirectional semiconductor switch 410. For example, the impedance R480 may be located between the output of the timing circuit 420 and the input of the trigger device (diac 430 and bridge 470). As another example, the impedance R480 may be located inside the bridge 470, in series with the diac 430.

Figure 2B:
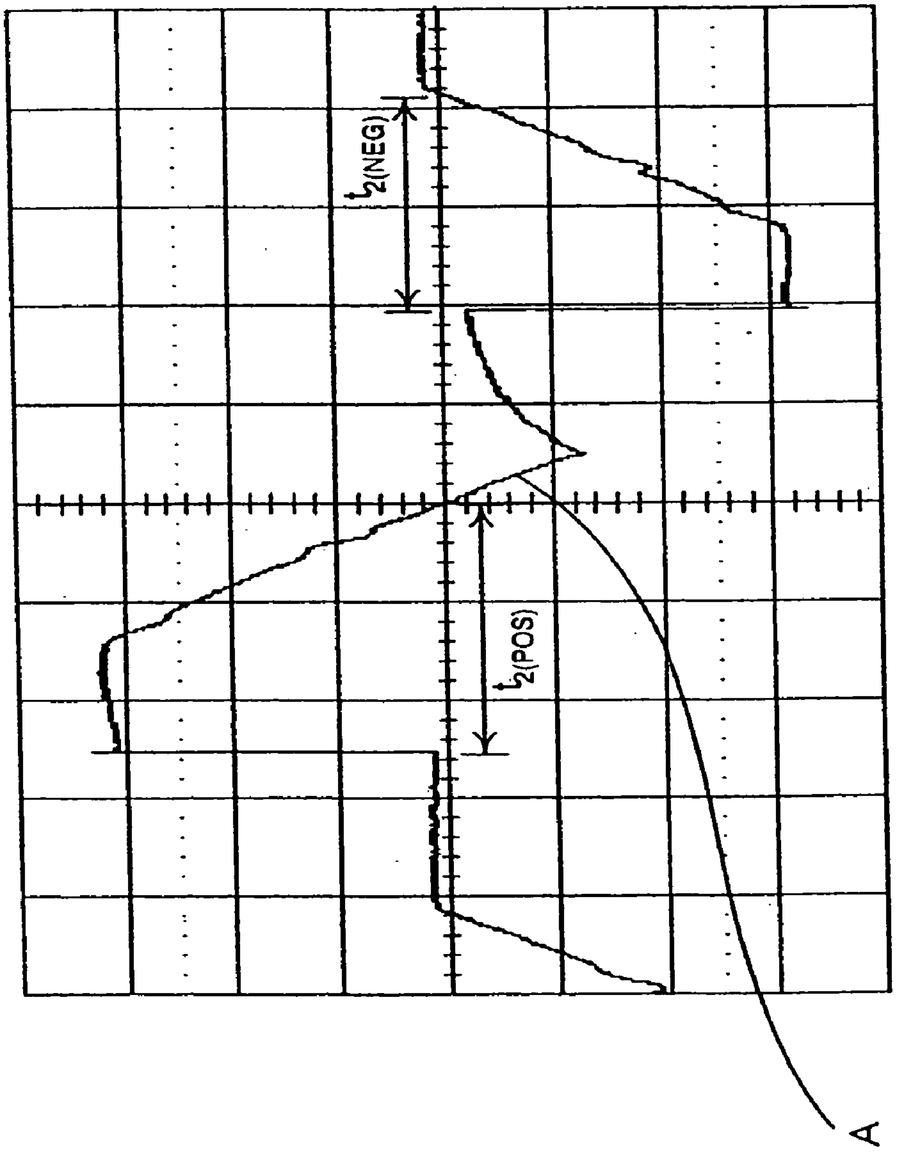
FIG. 2B shows the output voltage waveform of the dimmer circuit of FIG. 2A.
Figure 3A:
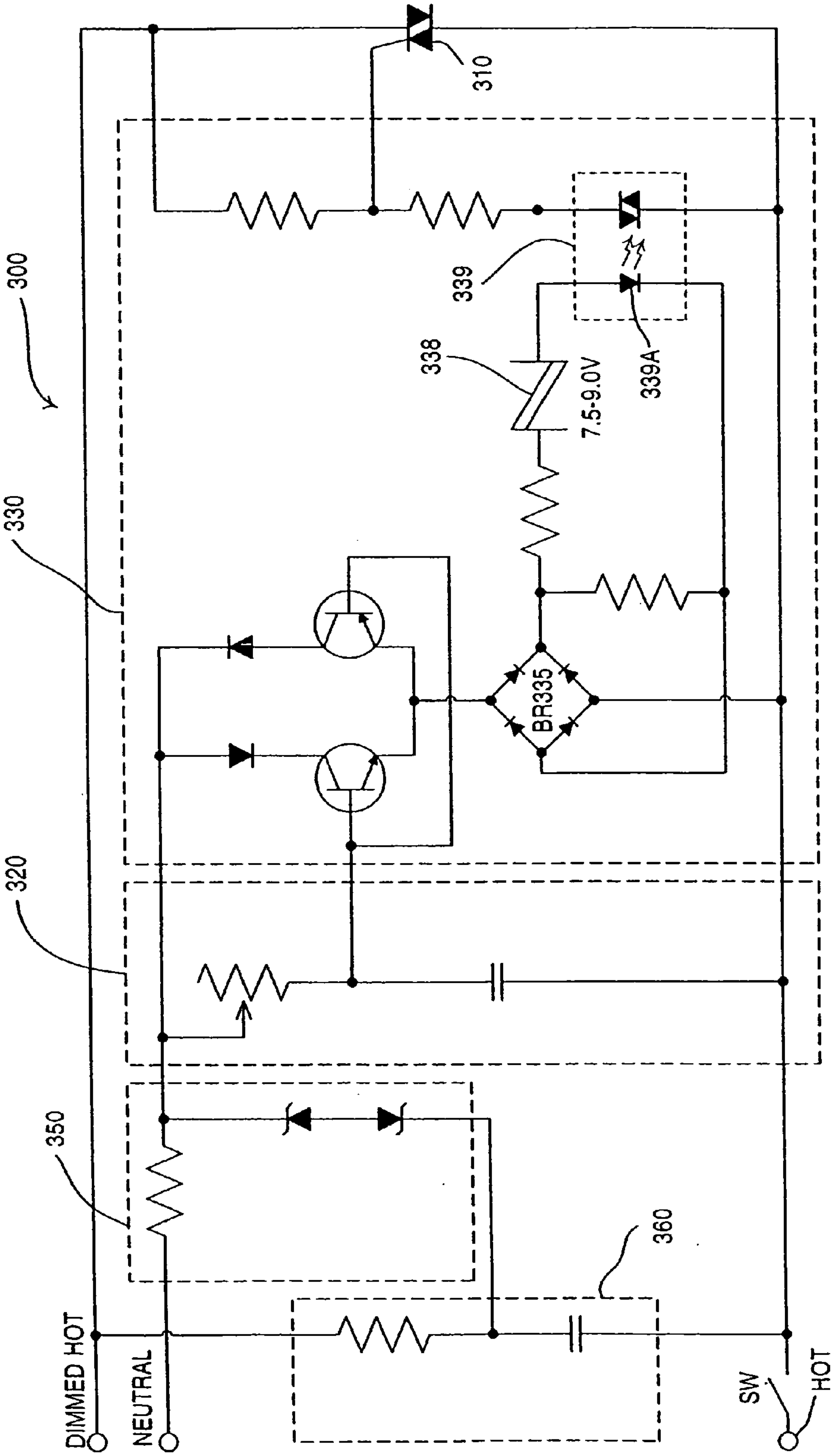
Fig. 3A Prior Art
FIG. 3A shows a prior art three-wire dimmer circuit.
Figure 3B:
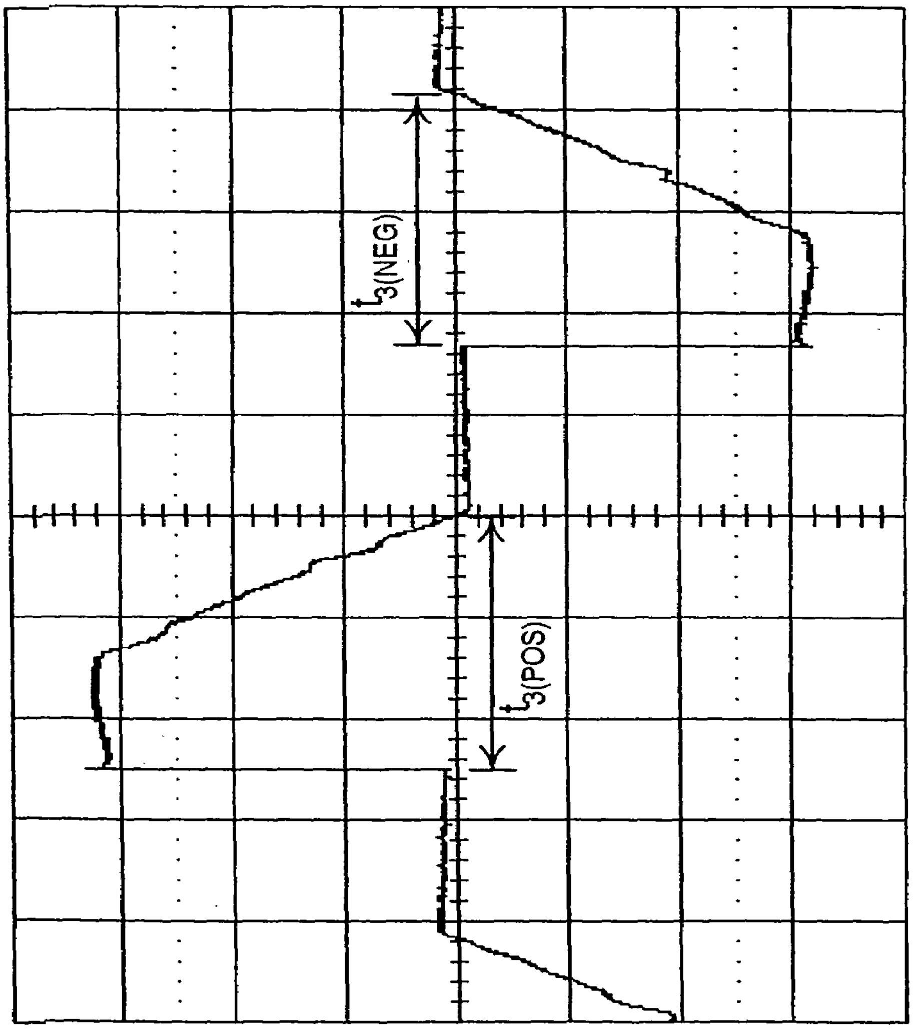
FIG. 3B shows the output waveform of the dimmer circuit of FIG. 3A.
Figure 3D:
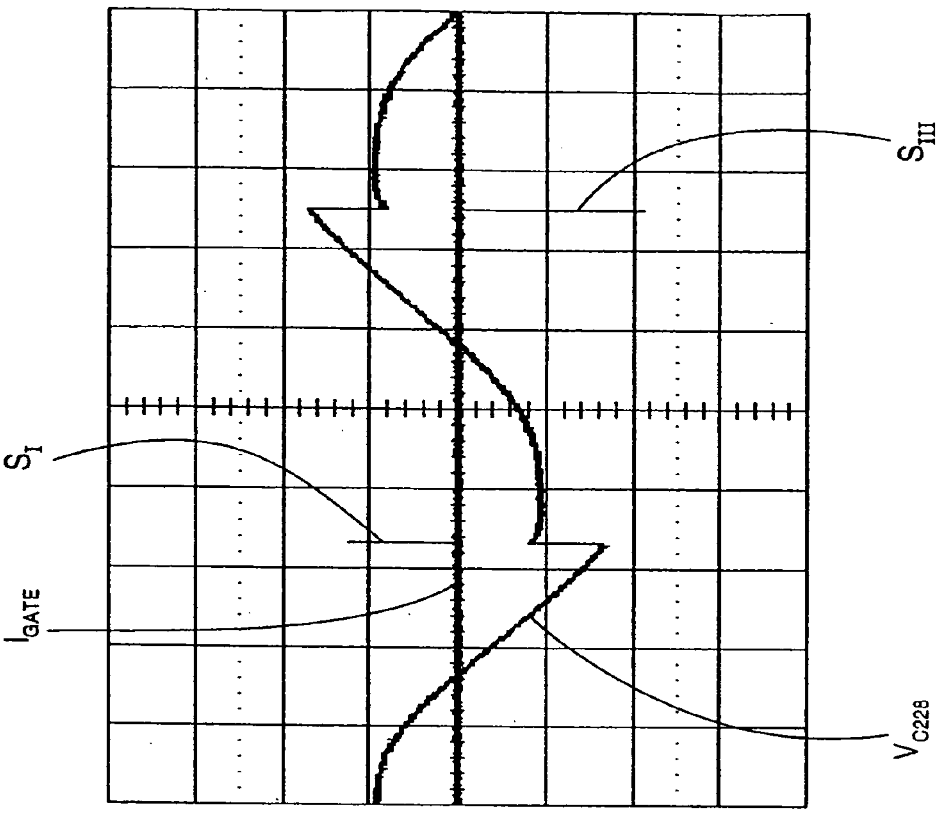
FIG. 3D shows the triac gate current and timing circuit capacitor voltage waveforms of the dimmer circuit of FIG. 2A.
Figure 3C:
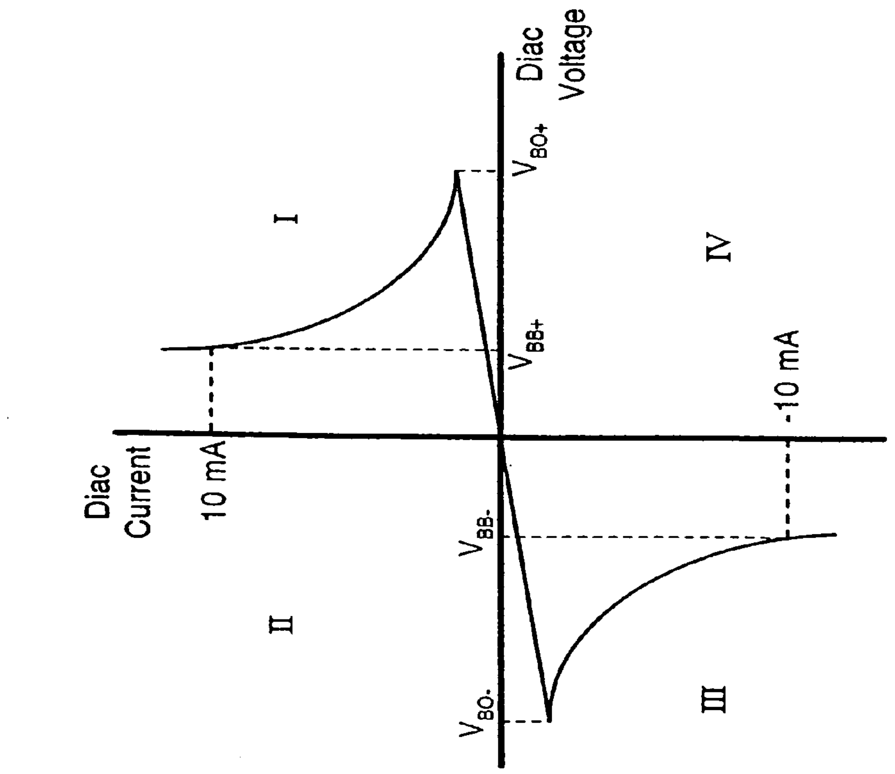
FIG. 3C shows the V-I characteristic of a typical diac.
Figure 4B:
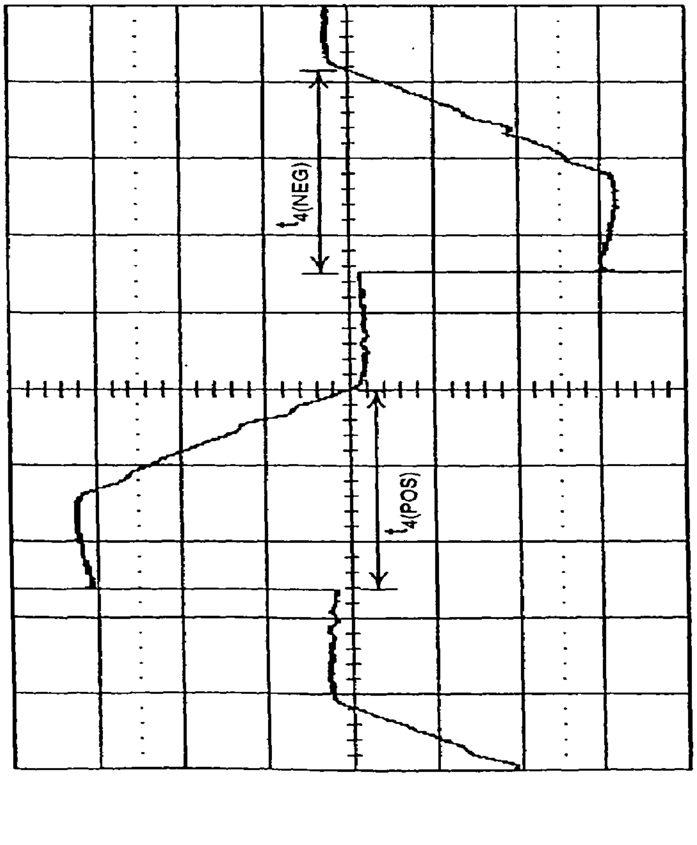
FIG. 4B shows the output voltage waveform of the load control circuit of FIG. 4A.

FIG. 4B shows the output voltage waveform of the circuit of FIG. 4A. As shown, the waveform shows much greater symmetry as shown by the conduction time $t_{4(POS)}$ of the triac in the positive half cycle being substantially equal to the conduction time $t_{4(NEG)}$ of the triac in the negative half cycle. The absence, in FIG. 4B, of the portion of the waveform labeled A in FIG. 2B, indicates that the transformer load is no longer in saturation, and that the waveform of FIG. 4B has a reduced DC component. The DC component of the waveform of FIG. 4B was observed by placing an RC low-pass filter between the output of the dimmer and neutral, and then measuring the DC voltage at the output of the dimmer with a multimeter. With the circuit of FIG. 4A, the DC component typically measures about 40 mV to about 60 mV on a 120 $V_{RMS}$ line.

Figure 4C:
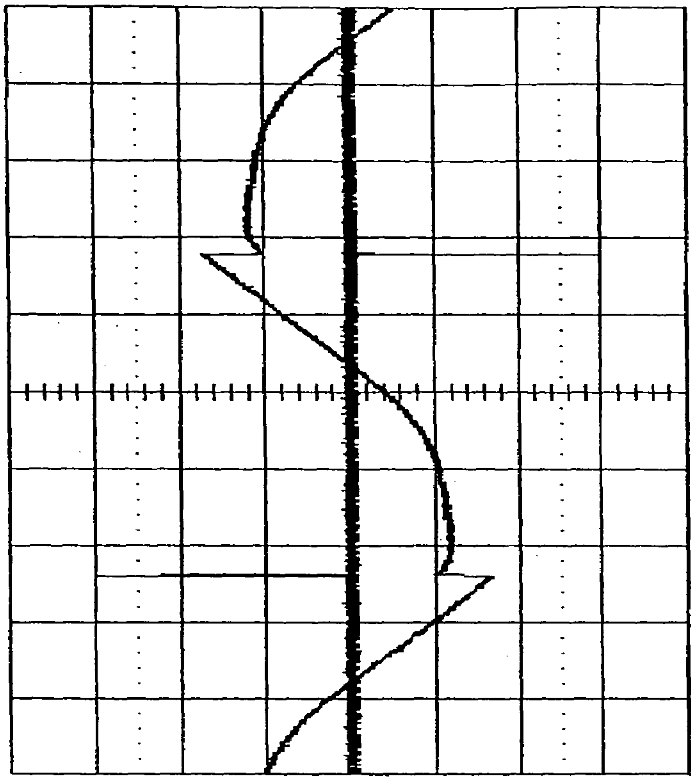
FIG. 4C shows the triac gate current and timing circuit capacitor voltage waveforms of the load control circuit of FIG. 4A.

Turning now to FIG. 4C, there may be seen the triac gate current and timing circuit capacitor voltage waveforms of the load control circuit of FIG. 4A. In FIG. 4C, the vertical voltage scale is 20 V/div, the vertical current scale is 50 mA/div, and the horizontal time scale is 2 ms/div. At the time the triac begins conducting in the positive half cycle, a spike of current of about 150 mA flows into the gate of the triac, and at the time the triac begins conducting in the negative half cycle, a spike of current of about 150 mA flows out of the gate of the triac. (In the plot of FIG. 4C, the polarity of the output voltage has been reversed for ease of viewing.) Not only has the relative difference between the triac gate current been reduced from about 70% (i.e., the difference between about 1.1 A versus about 0.65 A) to virtually zero, but the absolute magnitude of the triac gate currents has been reduced to about 14% (i.e., from about 1.1 A to about 150 mA) of its previous level, as compared to the prior art.

While the embodiment of FIG. 4A shows a diac in a bridge as the trigger device, other trigger devices may be used. For example, the trigger device may be a silicon bilateral switch (SBS) inside of a bridge, a sidac inside of a bridge, or a zener diode inside of a bridge.

Figure 5:
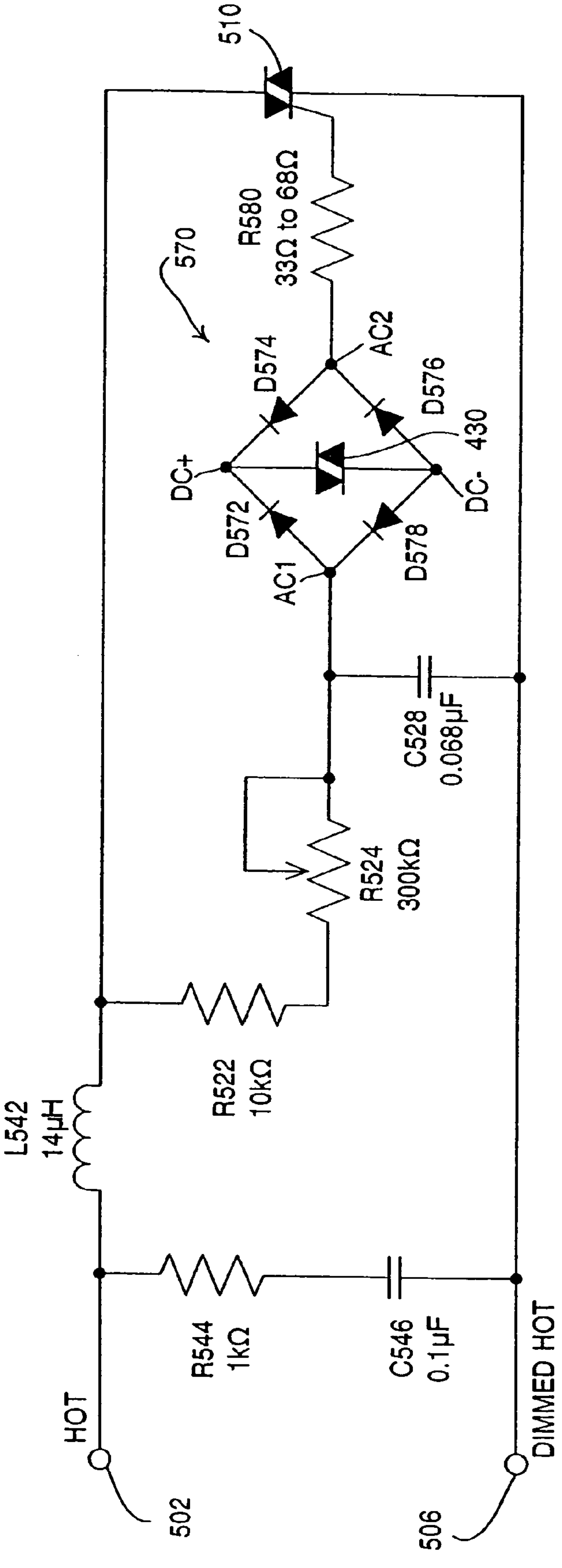
FIG. 5 shows a load control circuit according to the invention for the control of fan motor speed.

FIGS. 5 and 6 show two other embodiments of the invention. FIG. 5 shows an embodiment suitable for controlling the speed of motors, such as fan motors. The primary difference between the embodiment of FIG. 5 and the embodiment of FIG. 4A is the elimination of capacitor C426. Capacitor C426 helps to eliminate “pop on” in dimmers for lamp loads. This is the phenomenon of hysteresis wherein when going from the off state to a desired low light level, a user must first raise the light level up to a level above the desired level before the lamp turns on, and then dim the light level back down to the desired low light level. For motor loads, however, the voltage to be applied to drive the motor, even at the lowest speeds, rarely drops below 60 volts, which is the voltage at which dimmers typically “pop on”. Accordingly, the hysteresis eliminating capacitor may usually be omitted from motor control load circuits. However, the embodiment of FIG. 5 may be used with lamp loads where the phenomenon of “pop on” is not an issue.

FIG. 6 shows the prior art dimmer circuit of FIG. 2A modified in accordance with the invention by placing the trigger device diac 630 inside of a rectifier bridge 670, and placing a gate current limiting impedance, resistor R680, in series electrical connection with the gate of the bidirectional semiconductor switch, triac 610.

Figure 7:
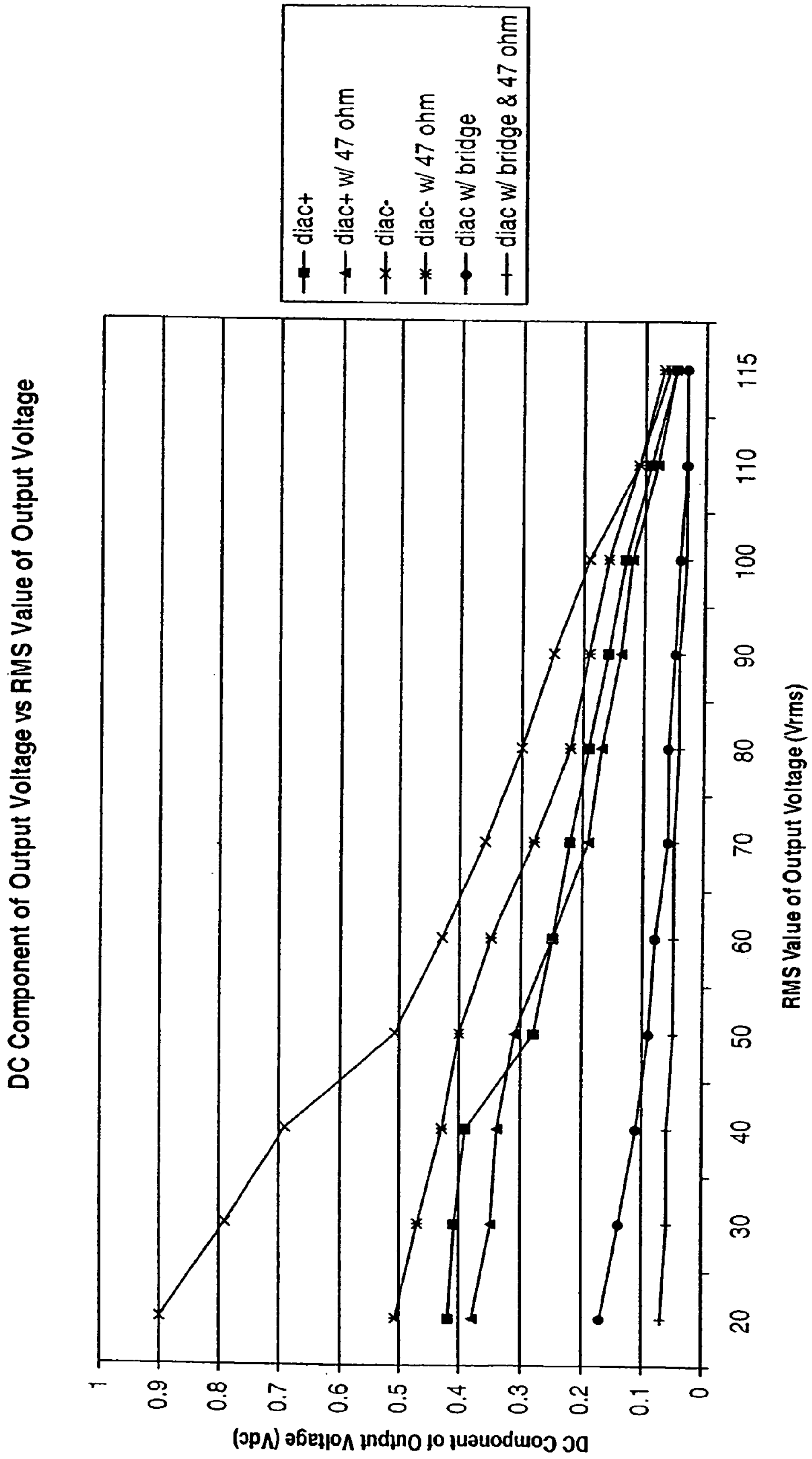
FIG. 7 shows plots of the DC component of the output voltage waveform versus the RMS value of the output voltage for a variety of embodiments of a load control circuit both with and without elements of the present invention.

FIG. 7 shows plots of the DC component of the output voltage waveform, versus the RMS value of the output voltage, for a variety of embodiments of a load control circuit, both with and without elements of the present invention. The values shown in FIG. 7 were obtained by measuring the DC output of various two-wire load control circuit configurations connected to a line voltage source to drive a 120 V incandescent lamp load.

In FIG. 7, the plots labeled diac+ and diac− represent the DC component of the output voltage waveform for the prior art dimmer circuit of FIG. 2A across substantially the entire dimming range, from the low end—when there is no appreciable amount of light emanating from the lamp (about 20 $V_{RMS}$)—to the high end—when essentially all of the available line voltage (about 115 $V_{RMS}$) is supplied to the lamp.

The plot labeled diac+ represents the output of a prior art two-wire dimmer circuit with the trigger device diac installed in a first direction, and the plot labeled diac− represents the output of the same dimmer circuit with the trigger device diac installed in a second, opposite direction. The plots labeled diac+ w/ 47 ohm and diac− w/ 47 ohm represent the output of the prior art two-wire dimmer circuit with the addition of a triac gate current limiting resistor of 47 ohms. The plot labeled diac w/ bridge represents the prior art two-wire dimmer circuit with the addition of the trigger device diac inside a full-wave rectifier bridge. Finally, the plot labeled diac w/ bridge & 47 ohm represents the output of the load control circuit embodiment of FIG. 4A. Thus, it may be seen that, preferably, the DC component of the output voltage is below 0.2 $V_{DC}$, and more preferably, is below 0.1 $V_{DC}$, throughout substantially the entire dimming range of the load control circuit.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A load control circuit having first and second terminals for connection in series with a controlled load, the load control circuit comprising a bidirectional semiconductor switch for switching at least a portion of both positive and negative half cycles of an alternating current source waveform to the load, the bidirectional semiconductor switch having a control electrode, further comprising:

a phase angle setting circuit including a timing circuit which sets the phase angle during each half cycle of the AC source waveform when the bidirectional semiconductor switch conducts;

the phase angle setting circuit including a voltage threshold trigger device connected in series with the control electrode of the switch, further comprising a rectifier bridge connected in series between an output of the timing circuit and the control electrode of the semiconductor switch, and wherein the rectifier bridge has a first pair of terminals and a second pair of terminals, the first pair of terminals connected in series between the output of the timing circuit and the control electrode of the semiconductor switch, and the second pair of terminals connected to the voltage threshold trigger device;

whereby acoustic noise generated in the load connected in series with the load control circuit is reduced.

2. The circuit of claim 1, wherein the voltage threshold trigger device comprises a diac, a silicon bilateral switch, a sidac, or a zener diode.

3. The circuit of claim 1, wherein the semiconductor switch comprises a triac.

4. The circuit of claim 1, wherein the timing circuit comprises a resistor-capacitor time constant circuit.

5. The circuit of claim 1, wherein the rectifier bridge comprises four diodes connected in a bridge rectifier configuration.

6. The circuit of claim 4 wherein the resistor-capacitor time constant circuit includes a potentiometer for adjusting the phase angle at which conduction of the semiconductor switch occurs.

7. The circuit of claim 1, further comprising a filter comprising an inductor coupled in series with the load control circuit.

8. The circuit of claim 1, further comprising a filter comprising an RC circuit coupled across the load control circuit terminals.

9. The circuit of claim 1, wherein the load comprises a step-down transformer having a primary coupled in series with the load control circuit and having a secondary connected to a low voltage lamp load.

10. The circuit of claim 9, wherein the transformer comprises a toroidal transformer.

11. The circuit of claim 1, further comprising a resistor coupled in series with the control electrode of the switch.

12. The circuit of claim 1, wherein the rectifier bridge insures that current flows in the voltage threshold trigger device in only one direction.

13. The circuit of claim 1, wherein the load comprises a lamp load.

14. The circuit of claim 1, wherein the load comprises an electric motor.

15. The circuit of claim 1, further comprising a voltage compensation circuit coupled to the time constant circuit to alter the voltage supplied at the output of the timing circuit and thereby to compensate for a voltage across the load control circuit.

16. The circuit of claim 15, wherein the voltage compensation circuit includes a diac.

17. A method for reducing acoustic noise generated in an electrical load driven by a phase-cut load control circuit from an AC source waveform, the method comprising:

setting a phase angle during each half cycle of the AC source waveform when a bidirectional semiconductor switch conducts;

providing a voltage threshold trigger device connected in series with a control electrode of the switch, whereby control electrode current is provided to the switch when a threshold voltage is exceeded; further comprising providing the control electrode current to the switch such that the control electrode current flows in only one direction through the voltage threshold trigger device, thereby to reduce asymmetry in the control electrode current and contribute to reduced acoustic noise in the load.

18. The method of claim 17, wherein the step of providing the control electrode current to the switch comprises providing a rectifier bridge in series between an output of a phase angle setting circuit and the control electrode of the switch and wherein the rectifier bridge has a first pair of terminals and a second pair of terminals, the first pair of terminals connected in series between an output of the phase angle setting circuit and the control electrode of the switch, and the second pair of terminals connected to the voltage threshold trigger device.

19. The method of claim 17, further comprising providing a resistance in series with the control electrode to balance the current to the control electrode in each half cycle.

20. A load control circuit having first and second terminals for connection in series with a controlled load, the load control circuit comprising a bidirectional semiconductor switch for switching at least a portion of both positive and negative half cycles of an alternating current source waveform to a load, the bidirectional semiconductor switch having a control electrode, further comprising:

a phase angle setting circuit including a timing circuit which sets the phase angle during each half cycle of the AC source waveform when the bidirectional semiconductor switch conducts;

the phase angle setting circuit including a voltage threshold trigger device connected in series with the control electrode of the switch, further comprising a first circuit connected between the timing circuit and the control electrode of the semiconductor switch for insuring that current flowing through the voltage threshold trigger device flows in only one direction, and wherein the first circuit has a first pair of terminals and a second pair of terminals, the first pair of terminals connected in series between an output of the timing circuit and the control electrode of the semiconductor switch, and the second pair of terminals connected to the voltage threshold trigger device;

whereby acoustic noise generated in the load connected in series with the load control circuit is reduced.

21. The circuit of claim 20, wherein the first circuit comprises a rectifier bridge.

22. The circuit of claim 20, wherein the voltage threshold trigger device comprises a diac, a silicon bilateral switch, a sidac, or a zener diode.

23. The circuit of claim 20, wherein the semiconductor switch comprises a triac.

24. The circuit of claim 20, wherein the timing circuit comprises a resistor-capacitor time constant circuit.

25. The circuit of claim 21, wherein the bridge rectifier comprises four diodes connected in a bridge rectifier configuration.

26. The circuit of claim 24, wherein the resistor-capacitor time constant circuit includes a potentiometer for adjusting the phase angle at which conduction of the semiconductor switch occurs.

27. The circuit of claim 20, further comprising a filter comprising an inductor coupled in series with the load control circuit.

28. The circuit of claim 20, further comprising a filter comprising an RC circuit coupled across the load control circuit terminals.

29. The circuit of claim 20, wherein the load comprises a step-down transformer having a primary winding coupled in series with the load control circuit and having a secondary winding connected to a low voltage lamp load.

30. The circuit of claim 29, wherein the transformer comprises a toroidal transformer.

31. The circuit of claim 20, further comprising a resistor coupled in series with the control electrode of the switch.

32. The circuit of claim 20, wherein the load comprises a lamp load.

33. The circuit of claim 20, wherein the load comprises an electric motor.

34. The circuit of claim 20, further comprising a voltage compensation circuit coupled to the time constant circuit to alter the voltage supplied at the output of the timing circuit and thereby to compensate for a voltage across the load control circuit.

35. The circuit of claim 34, wherein the voltage compensation circuit comprises a diac.

36. A two-wire dimmer for delivering power from an alternating current, line voltage source to a load, comprising:

a bidirectional semiconductor switch, adapted to be coupled between said source and said load; said semiconductor switch having a control input and operable to provide an output voltage to said load;

a timing circuit adapted to be coupled between said source and said load and having an output; said timing circuit operable to generate a signal representative of a desired conduction time of said bidirectional semiconductor switch;

a trigger device having a first terminal in series electrical connection with said output of said timing circuit and a second terminal in series electrical connection with said control input of said bidirectional semiconductor switch; said trigger device having a first voltage-current characteristic when current is flowing from said first terminal to said second terminal, and a second voltage-current characteristic when current is flowing from said second terminal to said first terminal; wherein said first voltage-current characteristic is substantially identical to said second voltage-current characteristic; and an impedance in series electrical connection between said output of said timing circuit and said control input of said semiconductor switch such that said impedance ensures that the magnitude of the current that flows into said control input is substantially equal to the magnitude of the current that flows out of said control input.

37. The dimmer of claim 36, wherein said trigger device comprises:

a rectifier bridge having a first pair of terminals for receipt of an alternating current voltage and a second pair of terminals for outputting a direct current voltage; wherein said first pair of terminals are said first and second terminals of said trigger device; and a diac coupled between said second pair of terminals of said rectifier bridge.

38. The dimmer of claim 37, wherein said impedance comprises a resistor.

39. The dimmer of claim 38, wherein said timing circuit comprises a double-phase-shift resistor-capacitor circuit having a potentiometer.

40. The dimmer of claim 38, wherein said timing circuit further comprises a voltage compensation circuit, said voltage compensation circuit comprising:

a second rectifier bridge having a first pair of terminals for receipt of an alternating current voltage and a second pair of terminals for outputting a direct current voltage; and a second diac coupled between said second pair of terminals of said rectifier bridge;

whereby said voltage compensation circuit is operable to vary said desired conduction time in inverse relation to the RMS voltage of the source so as to substantially maintain the power delivered to said load at a desired level.

41. The dimmer of claim 40, wherein said timing circuit further comprises a DC compensation circuit, said DC compensation circuit comprising:

a DC compensation capacitor in series electrical connection between said voltage compensation circuit diac and said load; and a DC compensation resistor in series electrical connection between said source and the junction of said DC compensation capacitor with said voltage compensation circuit diac;

whereby said DC compensation circuit is operable to reduce a DC component of said output voltage by causing said conduction time of said bidirectional semiconductor switch to increase in alternate half cycles and to decrease in complementary alternate half cycles so as to substantially render said conduction time of said bidirectional semiconductor switch equal in each half cycle.

42. The dimmer of claim 36, wherein said timing circuit comprises a single-phase-shift resistor-capacitor circuit.

43. The dimmer of claim 42, wherein said timing circuit comprises a double-phase-shift resistor-capacitor circuit.

44. The dimmer of claim 43, wherein said timing circuit further comprises a potentiometer.

45. The dimmer of claim 42, wherein said timing circuit further comprises a potentiometer.

46. The dimmer of claim 36, wherein said timing circuit further comprises a voltage compensation circuit; said voltage compensation circuit operably coupled to vary said conduction time of said bidirectional semiconductor switch in inverse relation to the RMS voltage of said source so as to substantially maintain the power delivered to said load at a desired level.

47. The dimmer of claim 46, wherein said voltage compensation circuit comprises a diac.

48. The dimmer of claim 47, wherein said voltage compensation circuit further comprises a rectifier bridge having a first pair of terminals for receipt of an alternating current voltage and a second pair of terminals for outputting a direct current voltage; wherein said diac is coupled between said second pair of terminals of said rectifier bridge.

49. The dimmer of claim 48, wherein said output voltage comprises an alternating current component and a direct current component; said direct current component having a net value of less than 0.1 volts.

50. The dimmer of claim 36 wherein said impedance is coupled between said trigger device second terminal and said bidirectional semiconductor switch control input.

51. The dimmer of claim 36 wherein said impedance is coupled between said timing circuit output and said trigger device first terminal.

52. The dimmer of claim 37 wherein said impedance is coupled between said rectifier bridge second pair of terminals, in series electrical connection with said diac.

* * * * *